(12) United States Patent
Butzkuven et al.

(10) Patent No.: US 10,722,884 B2
(45) Date of Patent: Jul. 28, 2020

(54) METHOD FOR CHARACTERIZING A LIQUID TRANSPORT OF A TRANSPARENT LIQUID, CORRESPONDING LIQUID TRANSPORT CHARACTERIZATION APPARATUS AND CORRESPONDING SUBSTRATE MATERIAL

(71) Applicant: Testo SE & Co. KGaA, Lenzkirch (DE)

(72) Inventors: Astrid Butzkuven, Buchenbach (DE); Philipp von Olshausen, Freiburg (DE); Robert Rieger, Freiburg (DE)

(73) Assignee: Testo SE & Co. KGaA, Lenzkirch (DE)

( * ) Notice: Subject to any disclaimer, the term of this patent is extended or adjusted under 35 U.S.C. 154(b) by 260 days.

(21) Appl. No.: 15/873,267

(22) Filed: Jan. 17, 2018

(65) Prior Publication Data

US 2018/0207634 A1      Jul. 26, 2018

(30) Foreign Application Priority Data

Jan. 23, 2017    (DE) .................... 10 2017 101 221

(51) Int. Cl.
| | |
|---|---|
| *G01F 23/292* | (2006.01) |
| *B01L 3/00* | (2006.01) |
| *G01N 21/47* | (2006.01) |
| *G01N 21/00* | (2006.01) |

(52) U.S. Cl.
CPC ...... *B01L 3/502715* (2013.01); *G01F 23/292* (2013.01); *G01N 21/4738* (2013.01); *B01L 2200/146* (2013.01); *B01L 2300/0627* (2013.01); *B01L 2300/0861* (2013.01); *B01L 2400/0406* (2013.01); *G01F 23/2928* (2013.01); *G01N 21/00* (2013.01)

(58) Field of Classification Search
CPC ....... B01L 2400/0406; B01L 3/502715; B01L 3/502746; G01F 23/2928; G01N 21/4738
USPC ................. 250/577, 573, 574, 221
See application file for complete search history.

(56) References Cited

U.S. PATENT DOCUMENTS 8,460,607 B2 *   6/2013   Yang ................. B01L 3/502723
                                                                             356/445

FOREIGN PATENT DOCUMENTS

DE        102009000529        8/2010

OTHER PUBLICATIONS

Bundgaard, F. et al., "A Simple Opto-Fluidic Switch Detecting Liquid Filing in the Polymer-based Microfluidic Systems", In: Transducers & Eurosensors '07, The 14th International Conference on Solid-State Sensors, Actuators and Microsystems, Lyons, France, Jun. 10-14, 2007, pp. 759-762.

* cited by examiner

*Primary Examiner* — Que Tan Le
(74) *Attorney, Agent, or Firm* — Volpe and Koenig, P.C.

(57) ABSTRACT

In the case of a plate-shaped substrate material (20), in which a microfluidic structure (5) is formed, there is consequently the ability for light (11, 12) that was diffusely scattered by an inner wall (9) to be captured and that a fill level, a speed of advance or any other variable for characterizing a liquid transport of a liquid (8) in the microfluidic structure (5) be ascertained by calculation from the captured, diffusely scattered light (11, 12).

19 Claims, 3 Drawing Sheets

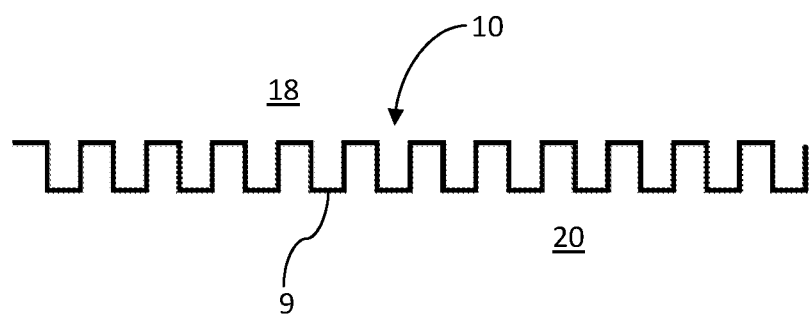
Fig. 5
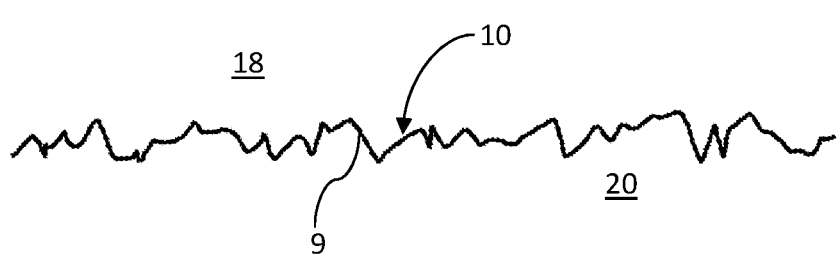
Fig. 6
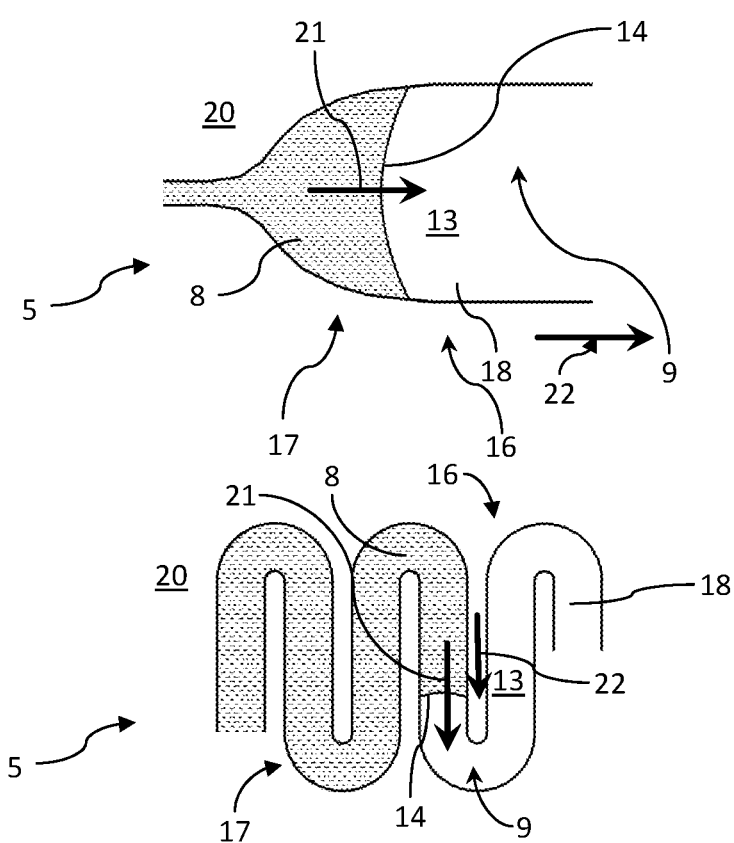
Fig. 7
Fig. 8

METHOD FOR CHARACTERIZING A LIQUID TRANSPORT OF A TRANSPARENT LIQUID, CORRESPONDING LIQUID TRANSPORT CHARACTERIZATION APPARATUS AND CORRESPONDING SUBSTRATE MATERIAL

INCORPORATION BY REFERENCE

The following documents are incorporated herein by reference as if fully set forth: German Patent Application No. 10 2017 101 221.4, filed Jan. 23, 2017.

BACKGROUND

The invention relates to a method for characterizing a liquid transport of a transparent liquid in a microfluidic structure, wherein the transparent liquid forms a meniscus that separates an unfilled section from a section of the microfluidic structure that is filled with the transparent liquid, and wherein light from surroundings of the meniscus is captured and measured for the purposes of ascertaining a measured variable that correlates with a fill level of the transparent liquid reached by the meniscus.

The invention further relates to a liquid transport characterization apparatus.

The invention finally relates to a substrate material having a microfluidic structure.

The transportation of liquids in microfluidic structures is known. Here, it is often of interest to characterize the flow behavior or the transport of the liquid. Different methods have been proposed which, essentially, provide the capture of the change in an optical light beam that is radiated into the liquid, with the creation or disappearance of total-internal reflection being monitored.

SUMMARY

The object of the invention is to develop an alternative method for characterizing the liquid transport.

This object is achieved using one or more features of the invention. in particular, in a method of the type described at the outset, provision is consequently made according to the invention for a variable that correlates with an intensity of light that is diffusely scattered at an inner wall of the microfluidic structure to be measured as a measured variable, for a portion (e.g. as an area) of the inner wall which is wetted by the transparent liquid to be calculated from the measured variable and for a variable for characterizing the liquid transport to be calculated from the calculated portion. The invention offers the advantage that a beam path of light need not be set up accurately for examination purposes in order to achieve the exact conditions which are required for adjusting or suppressing total internal reflection. Consequently, fewer constructive boundary conditions need to be considered when designing the microfluidic structure and when configuring an optical characterization method for characterizing the liquid transport. Consequently, the design of a liquid transport characterization method can be simplified.

In one configuration of the invention, provision can be made for the variable for characterizing the liquid transport to be a fill level. What is advantageous here is that direct statements about a fill level which was conveyed into the microfluidic structure are facilitated.

Alternatively, or additionally, provision can be made for the variable for characterizing the liquid transport to be a speed of advance. What is advantageous here is that direct statements about a change in the fill level of the microfluidic structure are facilitated. It is particularly expedient if the variable for characterizing the liquid transport is a speed of advance of the meniscus. Consequently, it is possible to directly calculate a fill level, for example the already mentioned fill level, by integration. Conversely, the speed of advance of the meniscus can be ascertained by virtue of the already mentioned fill level being differentiated with respect to the time. A speed of advance also allows conclusions to be drawn about a (mean) flow speed of the liquid, for example if the flow behavior is laminar or has little turbulence. Consequently, it is also possible to capture a flow rate of the liquid, for example as a volume per unit time.

In one configuration of the invention, provision can be made for the portion of the inner wall to be calculated by virtue of a size of a part of the microfluidic structure that is filled with the liquid being determined or being related to a corresponding overall size of the microfluidic structure. By way of example, this size can be an extent or the length in a direction of extent. What is advantageous here is that only a one-dimensional size has to be considered, which is expedient, in particular, if the microfluidic structure has a constant cross section. Moreover, what a constant cross-section renders achievable is that the liquid can flow without obstacles in the microfluidic structure.

If at least one height (e.g. the height across the direction of extent, in a recording direction and/or perpendicular to an observed surface) is constant in the direction of extent, it is possible to deduce the fill volume from an area of a wetted portion of the inner wall, in particular from the area of the filled section of the microfluidic structure.

In one configuration of the invention, provision can be made for the inner wall to offer a rough surface. Consequently, diffusely scattered light is producible in a simple manner, said diffusely scattered light indicating a non-wetted inner wall.

In one configuration of the invention, provision can be made for use to be made of a liquid which fills roughness structures of the surface upon wetting. What is advantageous here is that diffuse scattering of light after wetting is suppressible. Consequently, it is easy to distinguish between non-wetted and wetted parts of the inner wall. Here, it is particularly expedient for the refractive indices of liquid and substrate material forming the inner wall to have a difference which, in terms of absolute value, differs from a difference of the refractive indices of air and substrate material forming the inner wall, as will be described in more detail below.

Alternatively, or additionally, provision can be made for use to be made of a liquid which does not independently creep along the surface. What is advantageous here is that a defined fill state is assumed, which is suitable for characterizing a filled volume of the microfluidic structure and consequently the liquid transport of the liquid. Preferably, the liquid is conveyed or transported by means of a pressure that is applied or introduced from the outside.

In a configuration of the invention, provision can be made for the microfluidic structure to have a height which permits a unique relationship between a wetted area of the inner wall and an associated filled volume of the microfluidic structure. By way of example, this can be achieved by virtue of the height being chosen in such a way that both sides which define the height are always wetted or not wetted to the same extent. Consequently, it is possible to achieve defined fill conditions of the microfluidic structure which allow simple monitoring of the fill level or of the speed of advance of the meniscus.

In one configuration of the invention, provision can be made for the microfluidic structure to be embodied in such a way that the microfluidic structure is either completely filled or not wetted in each section, i.e., for example, at each point of a channel forming the microfluidic structure. By way of example, this can be achieved by way of a material choice of the substrate material and/or by way of geometric dimensioning of the microfluidic structure. What is advantageous here is that a bubble formation or a droplet formation in filled sections of the microfluidic structure is avoidable. Consequently, volume measurements or statements about filled volumes can be made with greater accuracy. It is particularly expedient here if a contact angle of the meniscus lies between 45° and 135°. It was found that such contact angle values are advantageous for a defined formation of a termination of the filled volume by the meniscus.

In an advantageous configuration, provision can be made for the microfluidic structure to be formed in a transparent substrate material. What is advantageous here is that a light for producing diffuse scattered light can simply be radiated in from the outside. Here, the cover, for example as a film or as a plate, may be embodied in a transparent or opaque manner, or in any other manner.

In a configuration of the invention, a clear internal cross-section of the microfluidic structure may be designed in such a way that bending of the meniscus causes substantially no change in the fill level or fill volume. Consequently, it is possible to dispense with capturing a radius of curvature at the meniscus for the purposes of measuring the volume or fill level. Preferably, the inner cross section is selected in relation to an intrinsic overall length of the microfluidic structure in such a way here that a linear profile emerges. It is expedient if the inner cross section is selected in such a way that capillary forces still act such that the liquid does not detach from an upper cover or similar boundary and that no bubbles form. A height of the inner cross section that is as low as possible is advantageous in that a high measurement accuracy is achievable.

As described above, a cross section of the structure that is as small as possible is advantageous. If a large overall volume is intended to be realized in the structure, the advantageous development as a linear structure or as a linear channel often emerges.

Consequently, provision can be made here, or in a further configuration of the invention, for the microfluidic structure to have a linear embodiment. By way of example, a linear form may emerge, or, e.g., be characterizable, by virtue of an extent in the direction of extent being substantially greater than a width and/or a height, in particular at least 10 times or at least 100 times greater. The linear embodiment of the structure is advantageous in that a probability of air inclusions and/or bubbles in the liquid is reducible. What is advantageous here is that it is particularly easy to carry out tracking of a filling process by capturing the fill level. Preferably, the linear structure is embodied in such a way that it fills an area. This is advantageous in that a particularly compact arrangement of the microfluidic structure is achievable, said arrangement requiring as little space as possible. By way of example, the microfluidic structure may have a meandering (meander-shaped) embodiment.

In one configuration of the invention, provision can be made for the liquid to be illuminated from outside of the microfluidic structure. By way of example, this may be achievable by a natural light source or by an artificial light source. What is advantageous here is that the microfluidic structure, preferably made out of the transparent substrate material, can easily be configured.

Alternatively, or additionally, provision can be made for the microfluidic structure to be illuminated using a dark field method and/or illuminated in a diffuse manner. What is advantageous here is that a direct illumination of a detector with which the diffusely scattered light is captured is avoidable. Consequently, it is possible to obtain increased measurement sensitivities of the (possibly weakly) scattered light.

In general, a dark field method can be understood to mean a method in which direct light radiation, which is radiated onto the microfluidic structure, passes the aforementioned detector such that the detector only captures the diffusely scattered light. Optionally, the detector is additionally arranged in such a way that (directed) reflected light passes the detector as well. What is advantageous here is that, consequently, a dark image background is created, from which the (non-wetted) inner wall is clearly differentiated on account of the diffusely scattered light. This can be captured optically and processed further in a simple manner.

In one configuration of the invention, provision can be made for at least one recording of the microfluidic structure to be captured to measure the measured variable. What is advantageous here is that an optical evaluation, for example by way of an intensity and/or by way of a feature analysis, may be performable for characterizing a fill level and/or a speed of advance. It is particularly expedient if a photographic recording is created. Consequently, known methods of image processing, in particular feature detection, are employable.

Here, provision can be made for a difference image between a recording of the microfluidic structure and a preceding recording of the microfluidic structure to be formed to measure the measured variable. What is advantageous here is that a partial volume of the microfluidic structure that has been filled in the meantime can easily be captured, for example in order to obtain a simple characterization of a change in the fill level.

In one configuration of the invention, provision can be made for an intensity of the diffusely scattered light to be captured for evaluating the measured variable. By way of example, this can be carried out by evaluating a recording or by an integral capture of the intensity. What is advantageous here is that a measured variable is obtained in a simple manner, said measured variable correlating with an area of the diffusely scattering inner wall, wherein fill levels and/or speeds of advance are easily derivable therefrom. In particular, provision can be made here for a difference between a captured intensity of the diffusely scattered light and a previously captured intensity of the diffusely scattered light to be formed to measure the measured variable. Consequently, information about the fill level is obtainable in a simple manner—even without capturing a recording and/or without a complicated evaluation of such a recording. This is because the invention has recognized that when the liquid can suppress diffuse scattering by wetting the inner wall, it is easily possible to obtain conclusions about a filled volume by evaluating the intensity of the scattered light.

In one configuration of the invention, provision can be made for refractive indices of liquid, substrate material and air to be selected in such a way that a first difference between the refractive indices of air and substrate material and a second difference between the refractive indices of liquid and substrate material are so different in terms of absolute value that a perceptible change in intensity of the stray light is obtained at the transition between air and liquid. Consequently, states for distinguishing non-wetted and wetted sections of the microfluidic structure that are easily capturable optically are obtainable in a simple manner. By way of example, the refractive index of the liquid may lie between the refractive index of the substrate material and the refractive index of air, or it is possible to use a liquid with a refractive index, for example a very large refractive index, which lies above the refractive index of air and the refractive index of the substrate material.

In one configuration of the invention, provision can be made for the microfluidic structure to provide a volume that is greater than the volume of the liquid. Consequently, the microfluidic structure becoming completely filled within the scope of the characterization method is avoidable and consequently it reaches into an e.g. downstream conveying device or into a downstream reservoir.

For achieving the aforementioned object, the invention moreover provides a liquid transport characterization apparatus with one or more features of the invention. Consequently, for the purposes of achieving the aforementioned objective, the invention provides a device for carrying out a method according to the invention, in particular as described above and/or according to any one of the claims directed to a method, on a liquid transport characterization apparatus.

Consequently, it is possible, for example, to configure a detector, in particular a camera, for capturing a variable that correlates with an intensity of light that is diffusely scattered at an inner wall of the microfluidic structure. By way of example, this measured variable can be at least a (local) brightness value in a recording and/or an integral brightness value of a recording or the result of an integral intensity measurement.

Thus, for example, an illumination device may be present for the inward radiation of light for producing the diffusely scattered light.

Further, a substrate material having one or more features of the invention is provided for achieving the aforementioned objective. In particular, there is consequently the suggestion according to the invention of forming a microfluidic structure in a substrate material, wherein the microfluidic structure has a rough surface in a section on an inner wall, said rough surface diffusely scattering light in a non-wetted state, wherein an intensity of diffusely scattered light is modified in a state welted by a transparent liquid. By way of example, this may be achieved by a reduction, in particular to less than half, preferably to less than one tenth.

Preferably, the substrate material is embodied for use in a liquid transport characterization apparatus according to the invention. Consequently, it is possible to provide a consumable on which the method according to the invention can be performed. Alternatively, or additionally, provision can be made for the substrate material to be embodied for use in a method according to the invention, in particular as described above and/or according to one of the claims directed to a method.

In general, the substrate material may have a flat, in particular plate-shaped embodiment, for example in rigid or flexible fashion. By way of example, a plate shape may denote a shape whose extent in one dimension (e.g. the height) is substantially less than in the other two dimensions (e.g. length and width). Plate-shaped substrate materials are particularly suitable for the optical examination in the method according to the invention because a light attenuation in the case of a lateral inward radiation, i.e. an inward radiation onto an area spanned by the large extents, may be kept low.

Here, the substrate material may be molded, preferably within the scope of injection molding. By way of example, this facilitates an expedient production of the substrate material, for example as a disposable product.

The plate-shaped substrate material may be generally structured and covered with a transparent layer or cover, for example with a film or a further plate, in order to form the microfluidic structure.

The flat substrate material may be formed with any circumferential contour. A circumferential contour which describes a polygonal chain, for example a rectangle or a regular polygon, may be expedient for being able to efficiently use a surface of an injection molding tool that is rectangular as a rule. However, pie-slice-shaped, round or irregular circumferential contours are also usable.

BRIEF DESCRIPTION OF THE DRAWINGS

The invention will now be described in more detail on the basis of exemplary embodiments without, however, being restricted to these exemplary embodiments. Further exemplary embodiments emerge by combining the features of individual claims or of a plurality of claims among themselves and/or with individual features or a plurality of features of the exemplary embodiments.

In the figures:

FIG. 5 shows a detailed view of an inner wall of the microfluidic structure according to FIG. 3 or 4 with a rough surface, FIG. 6 shows a detailed view of an inner wall of the microfluidic structure according to FIG. 3 or 4 with a further variant of a rough surface, FIG. 7 shows a plan view of a microfluidic structure, and FIG. 8 shows a plan view of a further microfluidic structure having a meandering profile.

DETAILED DESCRIPTION OF THE PREFERRED EMBODIMENTS

Figure 1:
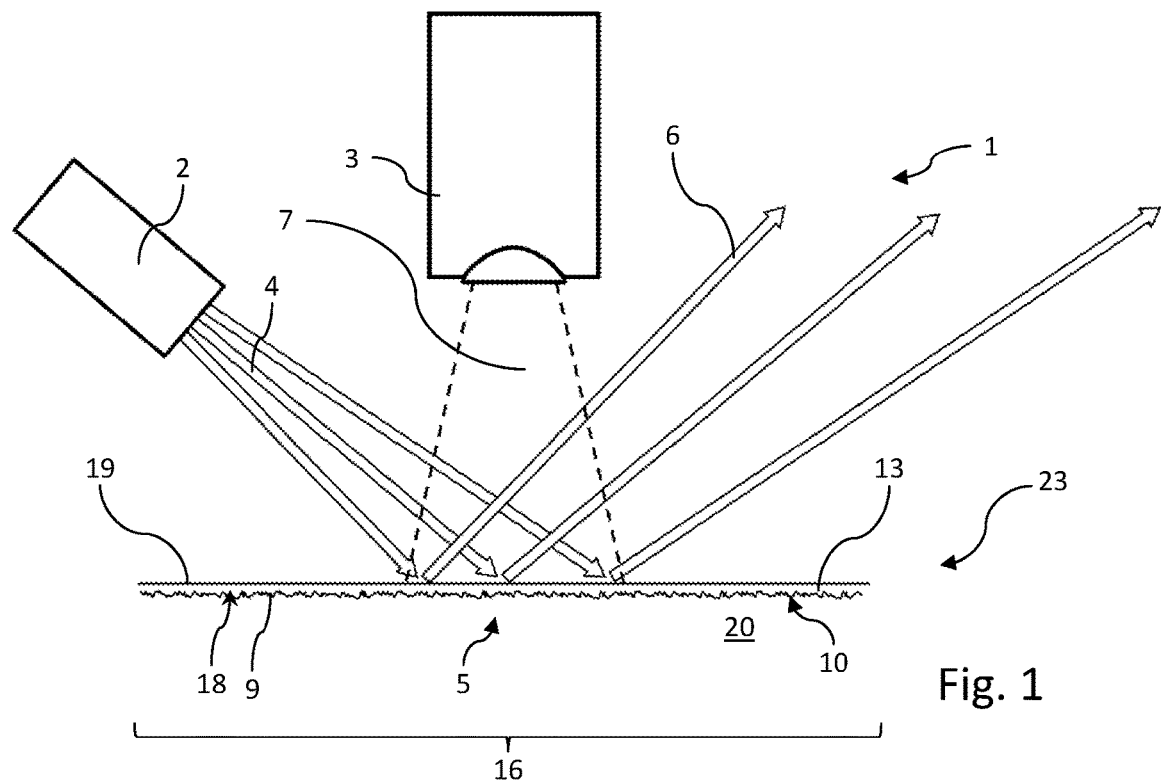
FIG. 1 shows a liquid transport characterization apparatus according to the invention, having an unfilled microfluidic structure.

FIG. 1 shows a general illustration of the principle of a liquid transport characterization apparatus according to the invention, denoted by 1 overall.

The liquid transport characterization apparatus 1 has an illumination device 2, a detector 3 and a receiving space 23 for a plate-shaped substrate material 20.

The illumination device 2, for example a light source or a light guiding apparatus such as, e.g., a mirror, is configured to radiate light 4 onto the substrate material 20 that has been inserted into the receiving space 23 or securely or detachably connected to the liquid transport characterization apparatus 1.

Here, the detector 3 and the illumination device 2 are arranged relative to one another in such a way that dark-field illumination is formed.

A microfluidic structure 5, which is illuminated by the inwardly radiated light 4, is formed in the substrate material 20 in a manner known per se.

Figure 3:
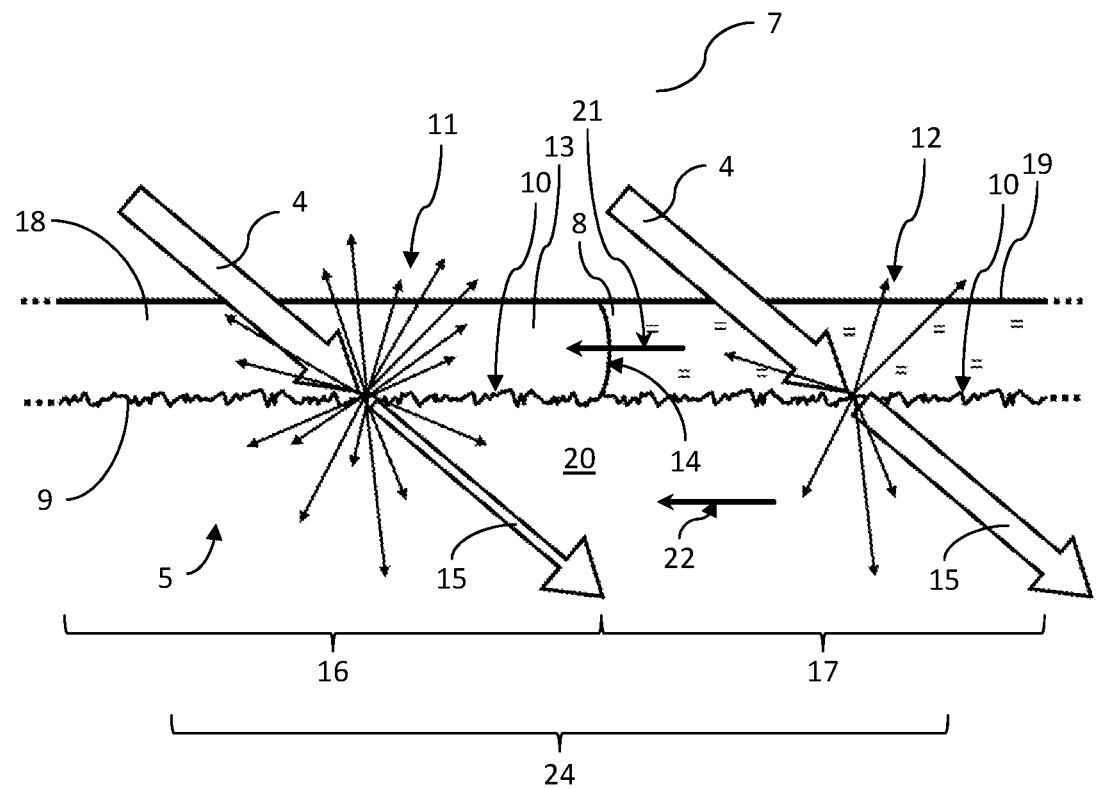
FIG. 3 shows a detailed view of FIG. 2 for explaining the method according to the invention.
Figure 4:
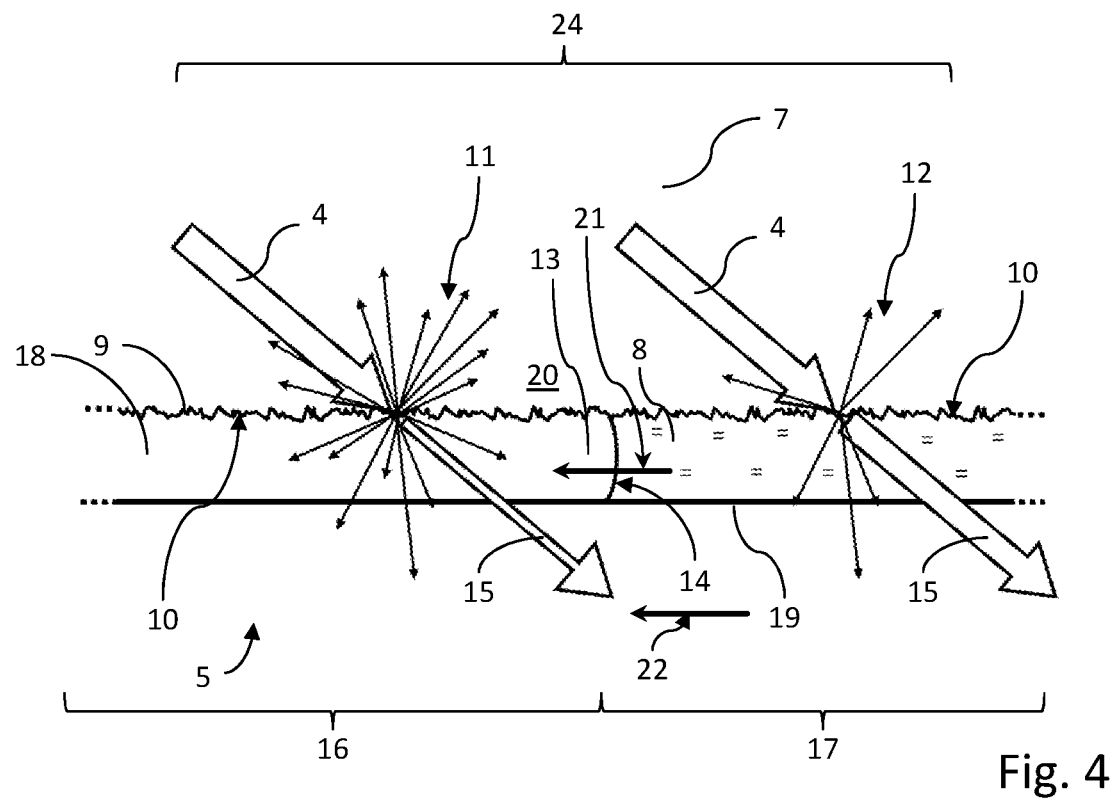
FIG. 4 shows a detailed view analogous to FIG. 3 in a further variant according to the invention of a liquid transport characterization apparatus.

In FIG. 1, this microfluidic structure 5 is unfilled such that—depending on the condition of the substrate material 20—the inwardly radiated light 4 is substantially emitted as reflected light 6 and/or it passes through the substrate material 20 as transmitted light 15 (cf. FIGS. 3, 4).

Figure 2:
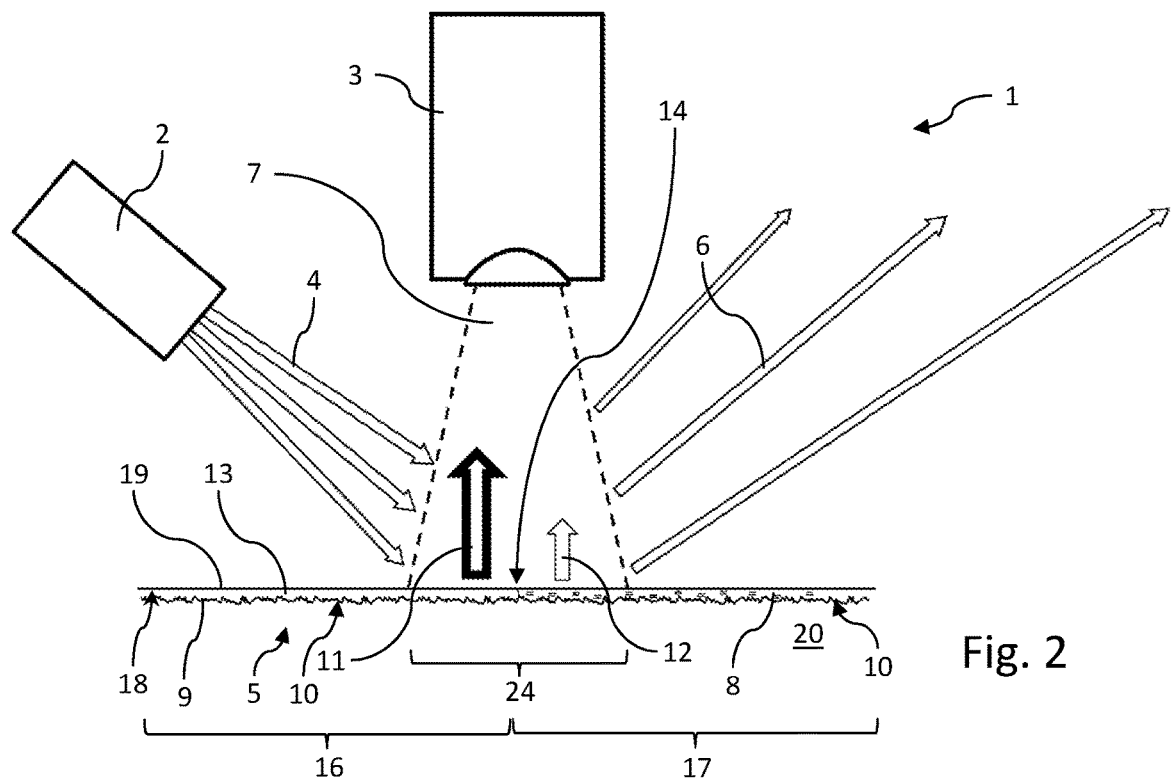
FIG. 2 shows the method according to the invention in the liquid transport characterization apparatus according to FIG. 1.

Here, the detector 3 is arranged in such a way that this reflected light 6 cannot be captured but passes the detector 3 by. As illustrated in FIG. 2, diffusely scattered light 11 reaches the detector. This scattered light is comparatively dark in comparison with the intensity of the reflected light 6.

However, in comparison with the subsequent situation according to FIG. 2, an output signal of the detector 3 indicates a bright capture region 7.

FIG. 2 shows the situation where the microfluidic structure 5 is partly filled with a liquid 8. Here, the microfluidic structure 5 is subdivided into an unfilled section 16 and a filled section 17, which are separated from one another by a meniscus 14. Here, the filled section 17 is fully filled with the liquid 8 while the unfilled section 16 is filled with air 13.

With its capture region 7, the detector 3 captures diffusely scattered light 11, 12 which is scattered at a rough surface 10 of an inner wall 9 of the microfluidic structure 5.

Here, the intensity of the diffusely scattered light 11, which is scattered at a non-wetted rough surface 10, i.e. in the unfilled section 16, is substantially greater than, for example more than twice as large as or even more than 10 times as large as, the intensity of the diffusely scattered light 12 that is scattered at the rough surface 10 in the filled section 17. Consequently, the capture region 7 in the unfilled state appears brighter than in the (partly or wholly) filled state.

Here, as a measured variable, the detector 3 measures a variable that correlates with the intensity of the scattered light 11, 12. In an exemplary embodiment, the detector 3 records an image or a recording of the capture region 7, wherein the image brightness of the pixels correlates with the intensity of the respectively captured scattered light 11, 12.

In a further exemplary embodiment, the detector 3 is configured to capture an integral brightness component for the entire capture region 7.

A computational unit (not depicted in any more detail) of the liquid transport characterization apparatus 1 calculates a portion of the inner wall 9 that is wetted with the liquid 8 from the captured measured variable. Subsequently, the computational unit calculates a variable for characterizing the liquid transport, for example a fill level or a speed of advance of the meniscus 14, from this portion.

FIG. 3 shows a detailed magnification of FIG. 2.

It is clear that the microfluidic structure 5 has a channel 18 which is formed in the substrate material 20 and which is covered with a film 19 or a similar transparent layer or cover.

The dimensions of the channel 18 are formed in such a way that the liquid 8 always wets both the inner wall 9 and the opposite film 19 or a similar transparent layer or cover.

Consequently, the fill volume of the liquid 8 can be calculated in a simple manner from the wetted portion of the inner wall 9, i.e. the area in the filled section 17 at least in the capture region 7.

FIG. 3 shows an exemplary embodiment in which the inwardly radiated light 4 initially passes through the film 19 or a similar transparent layer or cover and the channel 18 before it impinges on the inner wall 9 and is diffusely scattered at the rough surface 10. Some of the inwardly radiated light 4 is not diffusely scattered but passes out through the substrate material 20 as directed light 15 or—as shown in FIGS. 1 and 2—it is emitted as reflected light 6.

Some of the diffusely scattered light 11 or of the diffusely scattered light 12 is scattered into the capture region 7 of the detector 3 and consequently captured by the detector 3.

The illustration according to FIG. 3 shows that the portion of the diffusely scattered light 11 in the unfilled section 16 is significantly larger than the portion of the diffusely scattered light 12 in the filled section 17. This can be traced back to the wetting of the rough surface 10 in the filled section 17 substantially suppressing diffuse scattering because the roughness structures of the surface 10 are filled by the liquid 8.

Consequently, if the detector 3 is embodied as a camera, the filled section 17 appears darker than the unfilled section 16.

FIG. 4 shows an alternative exemplary embodiment of the invention, in which the inwardly radiated light 4 is initially radiated through the substrate material 20, wherein the inwardly radiated light 4 subsequently impinges on the rough surface 10, at which it is once again scattered diffusely as light 11, 12. Otherwise, the explanations made in respect of FIG. 3 apply accordingly to FIG. 4.

FIGS. 5 and 6 show, in an exemplary fashion, different options for forming a rough surface 10 at the inner wall 9. To this end, the substrate material 20 may be structured in a regular fashion (FIG. 5) or randomly (FIG. 6).

Here, the dimensions of the structuring are selected in such a way that a substantial portion of the inwardly radiated light 4 is diffusely scattered in the case of a non-wetted surface 10 and in the case of the employed wavelength of the inwardly radiated light 4.

FIGS. 7 and 8 show, in an exemplary manner, different embodiments of the microfluidic structure 5. Views as appear to a detector 3 equipped with a camera are illustrated.

The section 17 filled with the liquid 8 appears darker than the unfilled section 16.

As a result of this difference in contrast, it is possible to easily ascertain the area of the wetted inner wall 9. If the microfluidic structure 5 is embodied with a height that is constant along the direction of extent 22 (apart from surface roughness) (see FIG. 3 or FIG. 4), it is possible to calculate the fill volume of the liquid 8 from knowledge of the aforementioned area.

From FIG. 7, it is clear that the meniscus 14 has a bend or curvature, the formation of which has an influence on the actual fill volume, and hence on the fill level, on account of the width of the channel 18 across the direction of extent 22 and across the height. For an accurate measurement, this curvature would have to be captured and combined by calculation. If the curvature is too strong, inclusions or bubbles may form when filling the channel 18. These falsify the measurement result and should therefore be avoided, for example by way of a linear microfluidic structure 5.

FIG. 8 even shows the case where the cross section of the channel 18 in the direction of extent has a substantially constant or completely constant embodiment. Overall, a linear profile emerges. A curvature of the meniscus has substantially no influence on the fill level, and so it may be sufficient here only to capture the profile of the meniscus edge.

Moreover, FIG. 8 shows a meandering profile of the channel 18 which facilitates a good exploitation of the area.

During operation, the intensity of the diffusely scattered light 11, 12 is captured as described above in order to determine a size of a part of the microfluidic structure 5 that is filled with the liquid 8, i.e., for example, an area of the inner wall 9 in the filled section 17 or a fill level along the direction of extent 22, or at least to relate said size to a corresponding overall size of the microfluidic structure 5, i.e., for example, the overall area of the inner wall 9.

Consequently, it is possible to calculate a fill volume using a constant height of the microfluidic structure 5.

During operation, the liquid 8 flows in the flow direction 21.

As a result of this, an ever larger filled section 17 is formed, while the unfilled section 16 decreases.

As a result of this, there is, firstly, a decrease in the intensity of the diffusely scattered light 11, 12 overall (since the portion of the strongly scattered light 11 reduces and the portion of the weakly scattered light 12 increases) and, secondly, a growth of the dark portion (in a photographic recording or the like) of the microfluidic structure 5.

By recording difference images or by comparing recorded intensities at different times, it is consequently possible to calculate a change in the fill level, from which the speed of advance of the liquid 8 and, in particular, of the meniscus 14 arises.

At least in the embodiment according to FIG. 4, the substrate material 20 has a transparent embodiment in order to guide the inwardly radiated light 4 to the surface 10.

As already mentioned, the microfluidic structure 5 has such geometric dimensions that a fluid deposition (e.g. as drops) in the channel 18, in which the film 19 or a similar transparent layer or cover and the inner wall 9 are not wetted simultaneously, is prevented.

In this way, a unique relationship is established between the wetted area of the inner wall 9 and an associated filled volume of the microfluidic structure 5. In particular, a contact angle at the meniscus 14 lying between 45° and 135° is set in this case.

In order to produce a contrast between the unfilled section 16 and the filled section 17 when filling an unfilled section 16 in the capture region 7, the refractive indices of the liquid 8 and of the substrate material 20 are selected in such a way in the presented exemplary embodiments that the difference between the refractive indices of air 13 and the substrate material 20 on the one hand and the difference between the refractive indices of the liquid 8 and the substrate material 20 on the other hand differ in terms of their absolute value.

In the exemplary embodiments presented to this end, the refractive index of the liquid 8 is approximately 1.33 while the substrate material 20 has a refractive index of approximately 1.5. It is well-known that the refractive index of air 13 lies close to 1.

In the case of the plate-shaped substrate material 20, in which a microfluidic structure 5 is formed, there is consequently a suggestion that light 11, 12 that was diffusely scattered by an inner wall 9 be captured and that a fill level, a speed of advance or any other variable for characterizing a liquid transport of a liquid 8 in the microfluidic structure 5 be ascertained by calculation from the captured, diffusely scattered light 11, 12.

LIST OF REFERENCE SIGNS

1 Liquid transport characterization apparatus
2 Illumination device
3 Detector
4 Inwardly radiated light
5 Microfluidic structure
6 Reflected light
7 Capture region
8 Liquid
9 Inner wall
10 Rough surface
11 Diffusely scattered light (at a dry rough surface)
12 Diffusely scattered light (at a wetted rough surface)
13 Air
14 Meniscus
15 Transmitted light
16 Unfilled section
17 Filled section
18 Channel
19 Film
20 Substrate material
21 Flow direction
22 Direction of extent
23 Receiving space
24 Surroundings of the meniscus

The invention claimed is:

1. A method for characterizing a liquid transport of a transparent liquid (8) in a microfluidic structure (5), wherein the transparent liquid (8) forms a meniscus (14) that separates an unfilled section (16) from a section (17) of the microfluidic structure (5) that is filled with the transparent liquid (8), the method comprising capturing and measuring light (11, 12) from surroundings (24) of the meniscus (14) for ascertaining a measured variable that correlates with a fill level of the transparent liquid (8) reached by the meniscus (14), measuring a variable that correlates with an intensity of light (11, 12) that is diffusely scattered at an inner wall (9) of the microfluidic structure (5) as the measured variable, calculating a portion of the inner wall (9) which is wetted by the transparent liquid (8) from the measured variable as the calculated portion, and calculating a variable for characterizing the liquid transport from the calculated portion.

2. The method as claimed in claim 1, wherein the variable for characterizing the liquid transport is a fill level.

3. The method as claimed in claim 1, wherein the variable for characterizing the liquid transport is a speed of advance or a flow rate.

4. The method as claimed in claim 1, further comprising calculating the portion of the inner wall (9) by a size of a part of the microfluidic structure (5) that is filled with the liquid (8) being determined or being related to a corresponding overall size of the microfluidic structure (5).

5. The method as claimed in claim 1, wherein the microfluidic structure (5) has a at least one of a constant height or a constant cross section along a direction of extent (22).

6. The method as claimed in claim 1, wherein the inner wall (9) forms a rough surface (10).

7. The method as claimed in claim 6, wherein the liquid is at least one of a liquid (8) which fills a roughness structures of the surface (10) upon wetting or a liquid which does not independently creep along the surface (10).

8. The method as claimed in claim 1, wherein the microfluidic structure (5) has a height which permits a unique relationship between a wetted area of the inner wall (9) and an associated filled volume of the microfluidic structure (5).

9. The method as claimed in claim 1, wherein the microfluidic structure (5) is embodied such that the microfluidic structure (5) is either completely filled or not wetted in each section.

10. The method as claimed in claim 9, wherein microfluidic structure (5) is embodied by at least one of a material choice of the substrate material (20) or geometric dimensioning such that a contact angle of the meniscus (14) lies between 45° and 135°.

11. The method as claimed in claim 1, wherein the microfluidic structure (5) is formed in a transparent substrate material (20).

12. The method as claimed in claim 1, wherein the microfluidic structure (5) has a linear embodiment that fills an area in a meandering manner.

13. The method as claimed in claim 1, further comprising at least one of illuminating the liquid (8) from outside of the microfluidic structure (5), illuminating the microfluidic structure (5) using a dark field method, or illuminating the microfluidic structure (5) in a diffuse manner.

14. The method as claimed in claim 1, further comprising capturing at least one recording of the microfluidic structure (5) to measure the measured variable.

15. The method as claimed in claim 14, further comprising forming a difference image between a recording of the microfluidic structure (5) and a preceding recording of the microfluidic structure (5) to measure the measured variable.

16. The method as claimed in claim 1, further comprising capturing an intensity of the diffusely scattered light (11, 12) for measuring the measured variable, and forming a difference between a captured intensity of the diffusely scattered light (11, 12) and a previously captured intensity of the diffusely scattered light (11, 12) to measure the measured variable.

17. The method as claimed in claim 1, further comprising selecting refractive indices of the liquid (8), the substrate material (20) and air (13) such that a first difference between the refractive indices of air (13) and the substrate material (20) and a second difference between the refractive indices of liquid (8) and the substrate material (20) are so different in terms of absolute value that a perceptible change in intensity of stray light is obtained at a transition between air (13) and liquid (8).

18. The method as claimed in claim 1, wherein the microfluidic structure (5) provides a volume that is greater than a volume of the liquid (8).

19. A liquid transport characterization apparatus (1) for carrying out the method as claimed in claim 1, the apparatus comprising a detector (3) configured for capturing a variable that correlates with the intensity of light (11, 12) that is diffusely scattered at an inner wall (9) of the microfluidic structure (5), and an illumination device (2) to generate inward radiation of light (4) for producing the diffusely scattered light (11, 12).

* * * * *